(12) United States Patent
Montalbano

(10) Patent No.: US 6,595,159 B1
(45) Date of Patent: Jul. 22, 2003

(54) SIFTING LINER BAGS FOR A CAT LITTER BOX

(76) Inventor: Carlo Montalbano, 89 Fieldstone Rd., Staten Island, NY (US) 10314

( * ) Notice: Subject to any disclaimer, the term of this patent is extended or adjusted under 35 U.S.C. 154(b) by 0 days.

(21) Appl. No.: 10/071,622

(22) Filed: Feb. 9, 2002

(51) Int. Cl.$^7$ ............................................. A01K 29/00
(52) U.S. Cl. ..................................................... 119/167
(58) Field of Search ................................. 119/166, 167

(56) References Cited

U.S. PATENT DOCUMENTS

| | | | |
|---|---|---|---|
| 4,308,825 A | 1/1982 | Stepanian ................... | 119/167 |
| 4,312,295 A | 1/1982 | Harrington ................... | 719/167 |
| 4,870,924 A * | 10/1989 | Wolfe ........................ | 119/167 |
| 5,062,392 A | 11/1991 | Lavash ....................... | 119/167 |
| 5,121,712 A * | 6/1992 | Schulein, Jr. et al. ....... | 119/167 |
| 5,158,042 A | 10/1992 | Hammerslag et al. ...... | 119/167 |
| 5,207,772 A | 5/1993 | Lauretta et al. ............. | 119/167 |
| 5,551,376 A | 9/1996 | Lundeen ..................... | 119/167 |
| 5,890,452 A * | 4/1999 | Lundeen et al. ............ | 119/167 |
| 5,983,832 A | 11/1999 | Seo ............................. | 119/170 |

* cited by examiner

*Primary Examiner*—Robert P. Swiatek
(74) *Attorney, Agent, or Firm*—Goldstein & Lavas, P.C.

(57) ABSTRACT

A bag sifting system, for use with a cat litter box in separating waste products and clumped litter from uncontaminated litter, using a plurality of bags which are extended over the litter box before the litter box is filled with litter. As the litter becomes partially soiled, an uppermost of the bags is lifted from the litter box. Each bag has a sifting region having a plurality of sifting holes which allow uncontaminated litter to fall onto the remaining bags in the litter box below. The waste products and clumped litter, being too large to fall through the sifting holes, remains in the bag. The bag has a non-sifting region without holes, such that the bag is then tilted and rotated so that the waste products and clumped litter fall into the non-sifting region, and are contained therein for disposal.

4 Claims, 5 Drawing Sheets

SIFTING LINER BAGS FOR A CAT LITTER BOX

BACKGROUND OF THE INVENTION

The invention relates to a sifting liner bags system. More particularly, the invention relates to liner bags which are positioned at the bottom of a cat litter box, and are periodically lifted, whereupon uncontaminated litter is allowed to sift through the bag back into the litter box, while waste remains in the bag for disposal.

Keeping a domesticated cat usually involves maintaining a litter box for the cat to eliminate waste. The litter box is filled with cat litter which has a tendency to clump up when it contacts liquid waste such as cat urine, coats solid waste, and deodorizes the litter box.

After the litter box has been used for a few days, the litter box will contain a mixture of cat waste, clumped litter, and uncontaminated litter. Most cat owners recognize that at this point, it is not necessary to fully dispose of the entire contents of the litter box if the cat waste and clumped (used) litter can be removed.

Accordingly, many have proposed systems which attempt to remove the waste products while avoiding prematurely disposing of unused litter. Such systems generally involve scoops, and trays which give the owner the unpleasant task of manually digging through the litter to search for cat waste products. Generally these systems often result in breaking up the clumps of used litter into smaller pieces which undesirably remain behind with the uncontaminated litter.

Several United States Patents illustrate various attempts to provide a liner which may be lifted to sift the waste products from the litter. In particular, U.S. Pat. No. 5,207,772 to Lauretta et al.; U.S. Pat. No. 5,158,042 to Hammerslag et al.; U.S. Pat. No. 5,551,376 to Lundeen et al.; U.S. Pat. No. 5,062,392 to Lavash; U.S. Pat. No. 4,308,825 to Stepanian; U.S. Pat. No. 4,312,295 to Harrington; and U.S. Pat. No. 5,983,832 to Seo, illustrate various attempts. Most typically, these devices fail to disclose a device which could realistically be manufactured, and fit into a litter box. That is, they are either illustrated as a flat sheet which somehow fits within the three-dimensional rectangular prism hollow of the litter box, or they are a bag which is drawn to "conveniently" fit within the box, without illustrating seams, pleats, or other adaptations which would actually allow the same to take place in the real world. In addition, by providing an open sieve, they require a separate disposal vessel for disposing of the collected waste and used litter.

While these units may be suitable for the particular purpose employed, or for general use, they would not be as suitable for the purposes of the present invention as disclosed hereafter.

SUMMARY OF THE INVENTION

It is an object of the invention to provide a litter sifting bag which lines a litter box and allows waste products and used litter to be collected while leaving uncontaminated litter behind. Accordingly, the bag has a plurality of sifting openings which allow the relatively smaller particles of uncontaminated litter to pass easily therethrough, while collecting the larger clumps of used litter or waste products.

It is another object of the invention to provide a litter sifting bag which is capable of being inexpensively and realistically manufactured, while fitting over the edges of a conventional litter box. Accordingly, the sifting bag is configured with front and rear rectangular panels, connected by a bottom seam and side folds. The front and rear panels have a plurality of substantially uniformly spaced sifting holes.

It is yet another object of the invention to provide a litter sifting bag which allows the litter box to be used for an extended period of time without the need to prematurely remove and discard uncontaminated litter. Accordingly, a plurality of bags are fitted onto the litter box in a stacked configuration prior to filling the litter box with cat litter on top of the stack of bags. Periodically, when the litter is partially soiled, a single bag is lifted from its edges, causing all uncontaminated litter to sift through the bag, while retaining used litter and waste products. The uncontaminated litter is thereby aerated in the process. Additional bags in the stack remain at the bottom of the litter box for subsequent sifting.

It is a still further object of the invention to provide a litter sifting bag which can itself be used for litter disposal. Accordingly, after all uncontaminated litter has been effectively sifted through the sifting holes, the bag is tilted toward one of the side folds such that waste products and used litter are contained within the non-sifting areas of the bag, and the bag may be bound for safe and hygienic disposal.

The invention is a bag sifting system, for use with a cat litter box in separating waste products and clumped litter from uncontaminated litter, using a plurality of bags which are extended over the litter box before the litter box is filled with litter. As the litter becomes partially soiled, an uppermost of the bags is lifted from the litter box. Each bag has a sifting region having a plurality of sifting holes which allow uncontaminated litter to fall onto the remaining bags in the litter box below. The waste products and clumped litter, being too large to fall through the sifting holes, remains in the bag. The bag has a non-sifting region without holes, such that the bag is then tilted and rotated so that the waste products and clumped litter fall into the non-sifting region, and are contained therein for disposal.

To the accomplishment of the above and related objects the invention may be embodied in the form illustrated in the accompanying drawings. Attention is called to the fact, however, that the drawings are illustrative only. Variations are contemplated as being part of the invention, limited only by the scope of the claims.

BRIEF DESCRIPTION OF THE DRAWINGS

In the drawings, like elements are depicted by like reference numerals. The drawings are briefly described as follows.

DETAILED DESCRIPTION OF THE PREFERRED EMBODIMENTS

Figure 1:
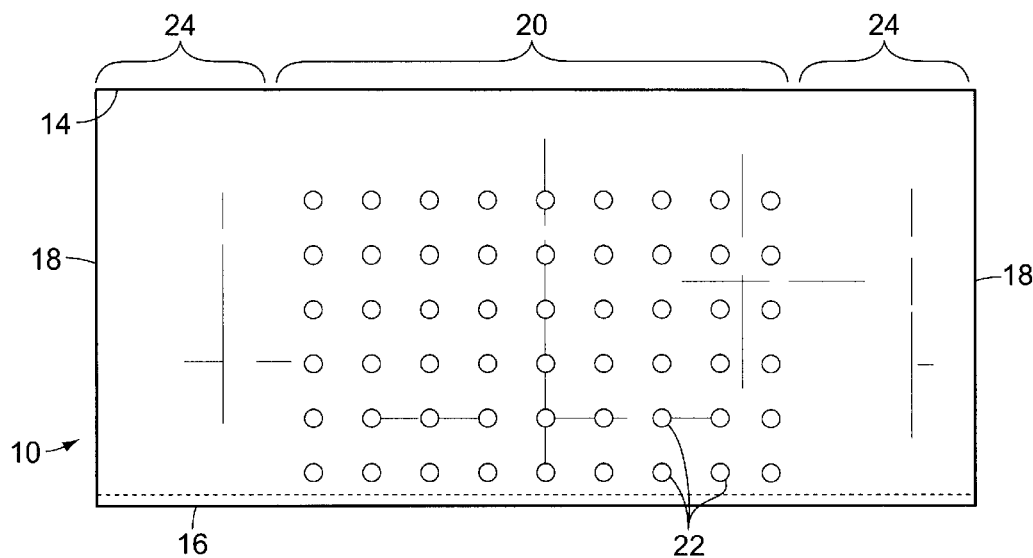
FIG. 1 is a front elevational view of the bag, illustrating the front panel, and the sifting holes extending therethrough.

FIG. 1 illustrates a sifting bag 10 laid flat, having a rectangular front panel 12, a top edge 14, a bottom edge 16, and two side edges 18. The front panel 12 has a sifting region 20, comprising a plurality of sifting holes 22, spaced substantially uniformly within the sifting region 20. The sifting region 20 is located substantially centered between the side edges 18 and offset toward the bottom edge 16. The front panel 12 also has a pair of non-sifting regions 24 near the side edges 18. The non-sifting regions 24 do not contain sifting holes and are therefore capable of containing waste products thereat.

Figure 2:
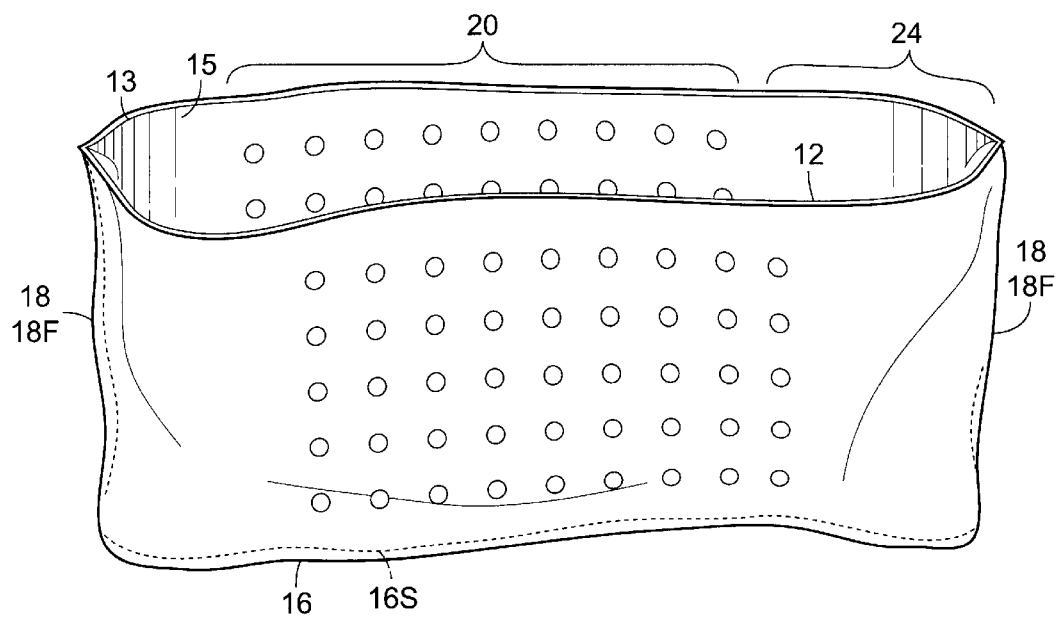
FIG. 2 is a front perspective view of the bag, slightly opened to illustrate the top opening between the front panel and rear panel, the rear panel also having the sifting holes aligned with those on the front panel, the front and rear panels connected along the bottom seam and continuous across the side folds.

In FIG. 2, the sifting bag 10 has been partially opened to reveal a rear panel 13, which is substantially the same in size as the front panel, which extends substantially parallel to the front panel 12 prior to use, which is connected to the front panel along the bottom edge 16 with a bottom seam 16S, along the side edges 18 with side folds 18F, and creates a top opening 15. The rear panel 13 contains the sifting region 20 and associated sifting holes 22 in a substantially parallel and equivalent location as the front panel 12. Accordingly, between the front panel 12 and rear panel 13 a interior volume is created, accessible at the top opening 15.

Accordingly, in contrast to several prior art attempts, the present invention is capable of being realistically and inexpensively manufactured using technology commonly used for manufacturing plastic garbage bags. For example, a tube of thin plastic of considerable length is extruded, and then is folded flat, creating the front panel 12 and rear panel 13 of multiple bags 10, connected by the side folds 18F which form the side edges 18. The flattened tube is then heat sealed and perforated to create the bottom seam 16S at the bottom edge 16, such that when the bottom seam 16S is torn from an adjacent portion of the flattened tube, the top opening 15 is created in an adjacent bag. However, before they are separated, the sifting holes 22 are die stamped through both the front panel 12 and rear panel 13, thus their location is substantially identical. Accordingly, the bag 10 of the present invention is clearly manufacturable, and manufacturable efficiently using widely used technology and processes, in contrast to the devices vaguely described in prior art attempts.

Figure 3:
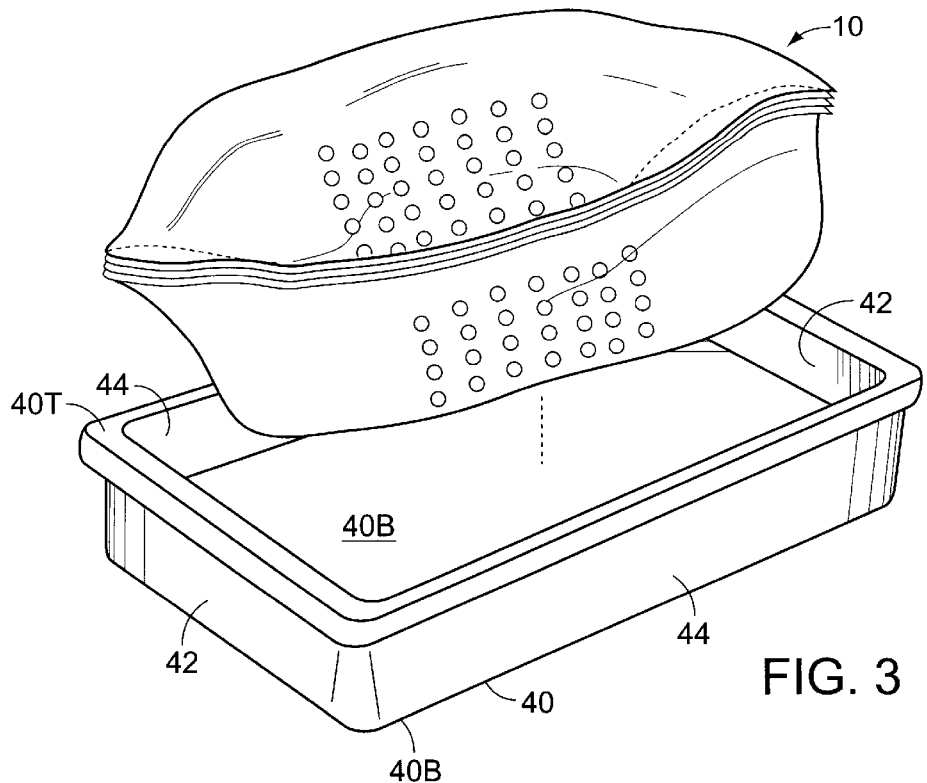
FIG. 3 is a diagrammatic perspective view, illustrating one of the bags about to be opened and extended over a standard litter box.

FIG. 3 illustrates a standard litter box 40, having a bottom 40B, a top lip 40T, a pair of parallel short interior sides 42 and a pair of parallel long interior sides 44 which extend from the bottom 40B to the top lip 40T. The litter box 40 is open at the top 40T with a substantially rectangular prism shaped interior volume defined within the litter box between the bottom and top. As illustrated in FIG. 3, one of the bags 10 according to the present invention is being opened for installation over the top lip 40T of the litter box 40.

Concerning practicalities which make the invention suitable for use with typical litter boxes, the bag 10 is preferably substantially 36 inches along the top edge, 18 inches along the side edges, the sifting region 20 makes up approximately one third to one half of the width of the bag as measured along the top or bottom edge, leaving non-sifting regions of approximately one quarter to one third the width each. In addition, the sifting holes are preferably one quarter to three quarter inches in diameter, and are located one to four inches apart within the sifting region. Most preferably, the holes are substantially 7/16 inches in diameter to properly catch the litter clumps and solid waste products.

Figure 4:
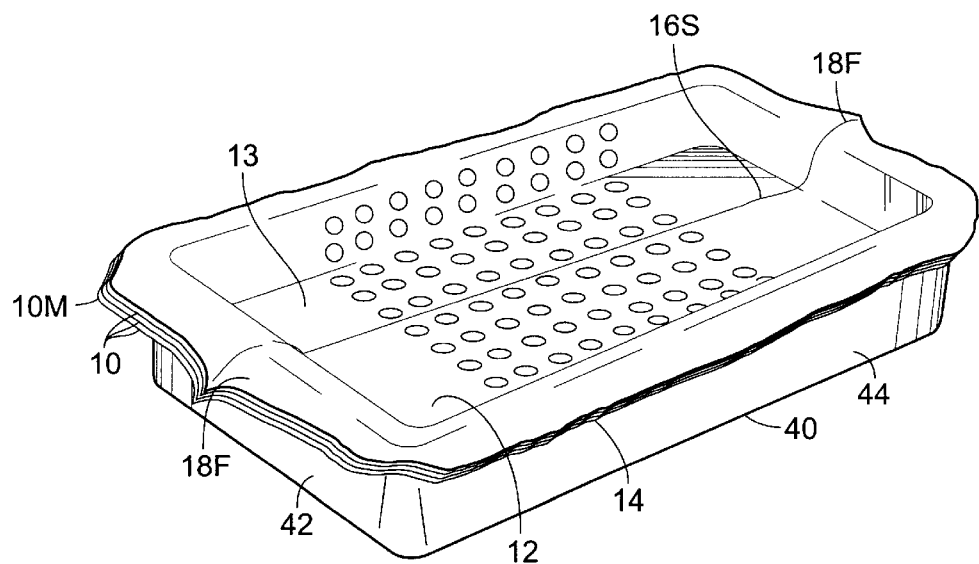
FIG. 4 is a diagrammatic perspective view, illustrating a stack of the bags fitted over the top edges of the litter box and extending across the bottom of the litter box.

FIG. 4 illustrates a stack 10M of bags 10 suitably installed onto the litter box 40. Each bag 10 has been opened wide, wherein the top edges 14 of the front panel 12 and rear panel 13 extend over the parallel long interior sides 44 and over the top lip 46 thereat. They extend over the short interior sides 42 as well, as the side folds 18F open up. The bottom seam 16S extends along the bottom of the litter box 40, substantially equidistant between the parallel long interior sides 44 of the litter box 40. The bags 10 of the stack 10M are individually loaded onto the litter box 40, and then the litter box 40 is filled with litter.

Figure 5:
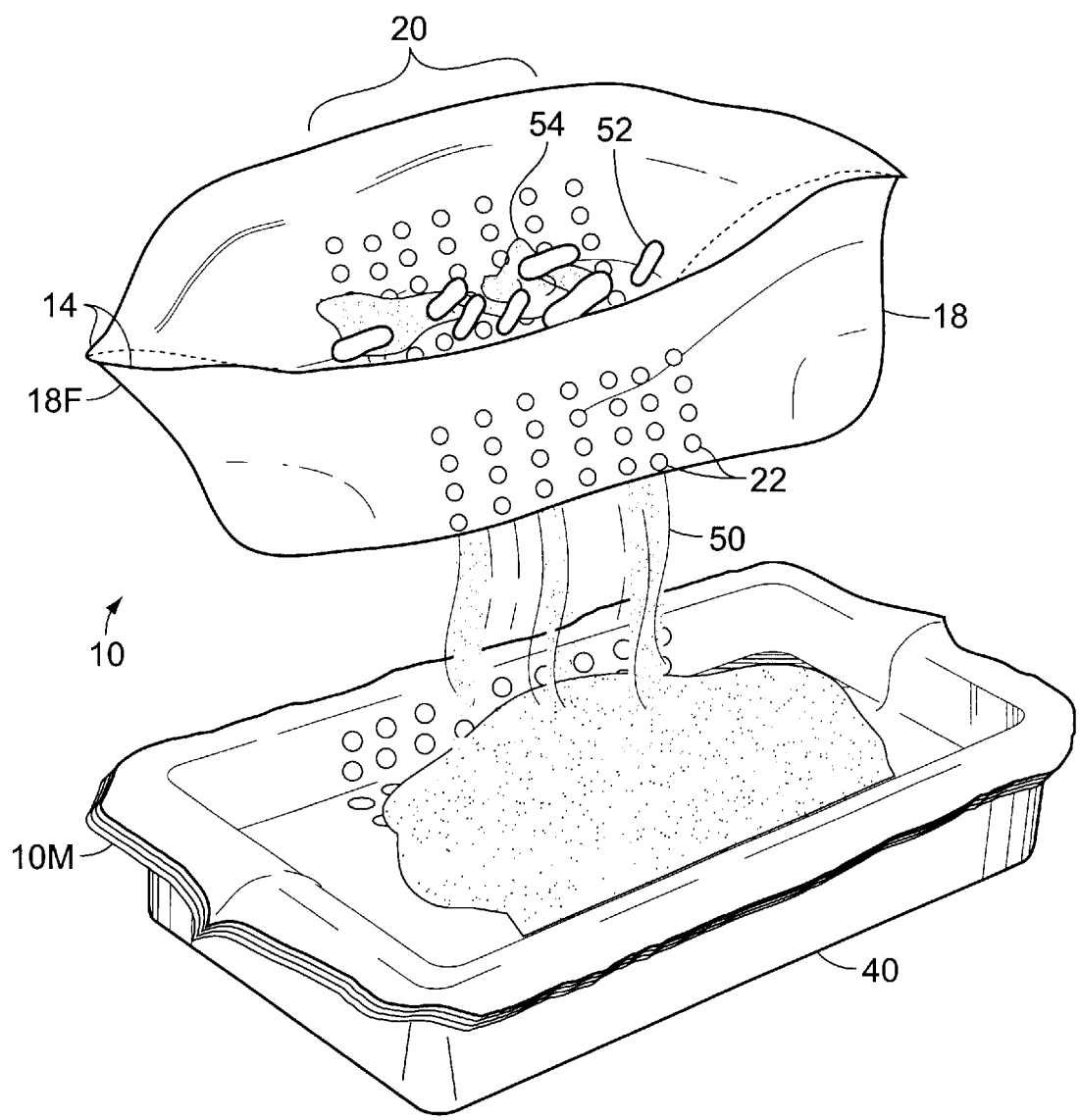
FIG. 5 is a diagrammatic perspective view, illustrating an uppermost one of the bags being separated from the stack and being lifted to collect used litter and waste, while allowing uncontaminated litter to sift into the litter box above the remaining bags in the stack.

FIG. 5 illustrates how, after a period of usage of the litter box such that the litter has become somewhat soiled, an uppermost one of the bags 10 has been removed from the stack 10M by lifting the bag upwards at the top edge 14 near the side folds 18F, with two hands. While lifting the bag upwards, the weight of the litter causes the bag 10 to gather in the center, directing uncontaminated cat litter 50 toward the sifting region 20 where the uncontaminated cat litter 50 easily travels through the sifting holes 22 and falls back into the litter box 40 above the stack 10M. However, waste products 52 and clumped litter 54 are too large to travel through the sifting holes 22, and remain within the interior volume of the bag 10. If necessary, the bag 10 is shaken by the user to ensure that all uncontaminated litter falls through the holes.

Figure 6:
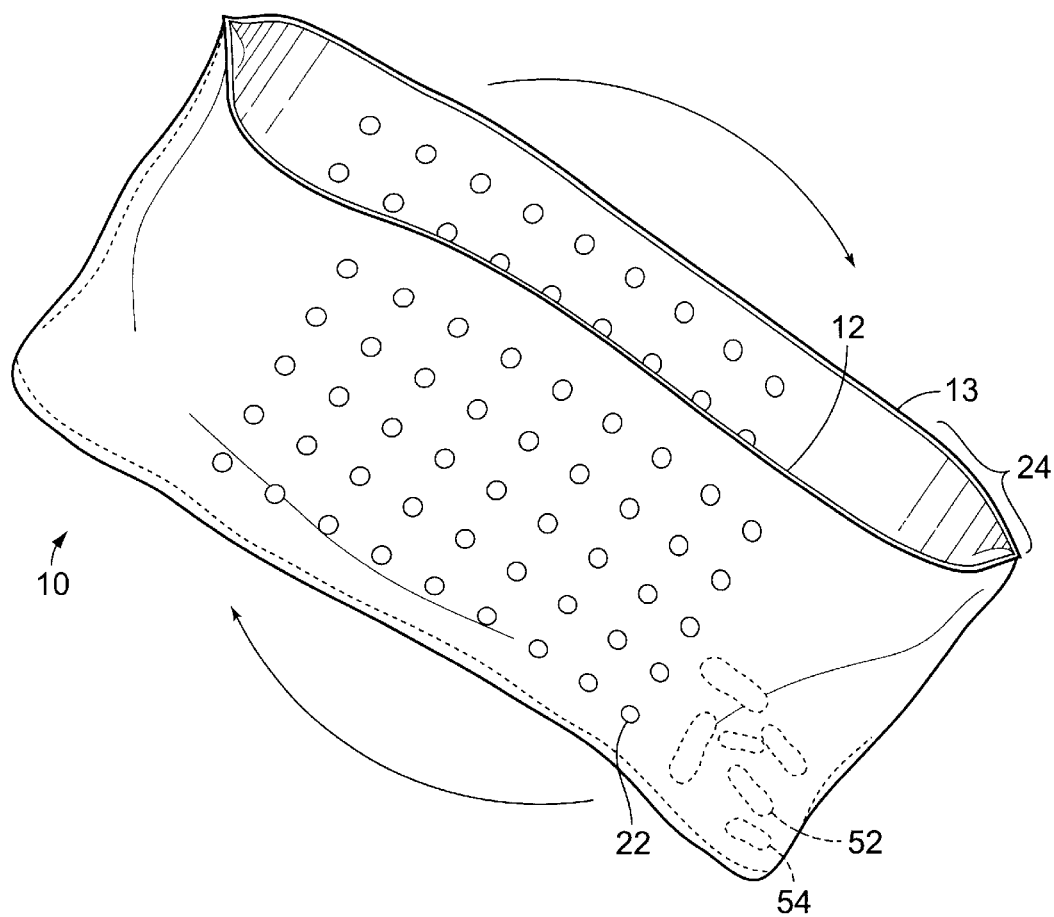
FIG. 6 is a diagrammatic perspective view, illustrating how following the sifting operation, the bag is rotated and tilted to allow the used litter and waste to fall into one of the non-sifting side areas for containment.

Following the complete sifting of the uncontaminated litter 50 back into the litter box 40, a relatively small mass of waste 52 and clumped litter 54 should remain within the interior volume of the bag 10. However, while centered within the bag 10 in the sifting region 20, a considerable chance remains that smaller particles of the clumped litter 54 will break free and fall onto the floor. Accordingly, while still holding the bag 10 over the litter box 40, the bag 10 should be rotated and tilted as shown in FIG. 6. Rotating and tilting the bag 10 causes the waste products 52 and clumped litter 54 to transfer into the non-sifting region 24, where no sifting holes 22 are present. When the waste products 52 and clumped litter 54 are contained between the non-sifting regions 24 of the front 12 and rear panels 13, there is no danger that small pieces might break loose and travel through the sifting holes 22 onto the floor. Accordingly, referring to FIG. 7, the bag 10 is then bound, either with a tying device, or by simply tying the bag into a knot, so that the sifting region 20 remains on one side of the knot or tie, to confine the waste products 52 and clumped litter 54 in the non-sifting region 24. The bag 10 can be easily disposed without requiring an additional disposal bag.

Figure 7:
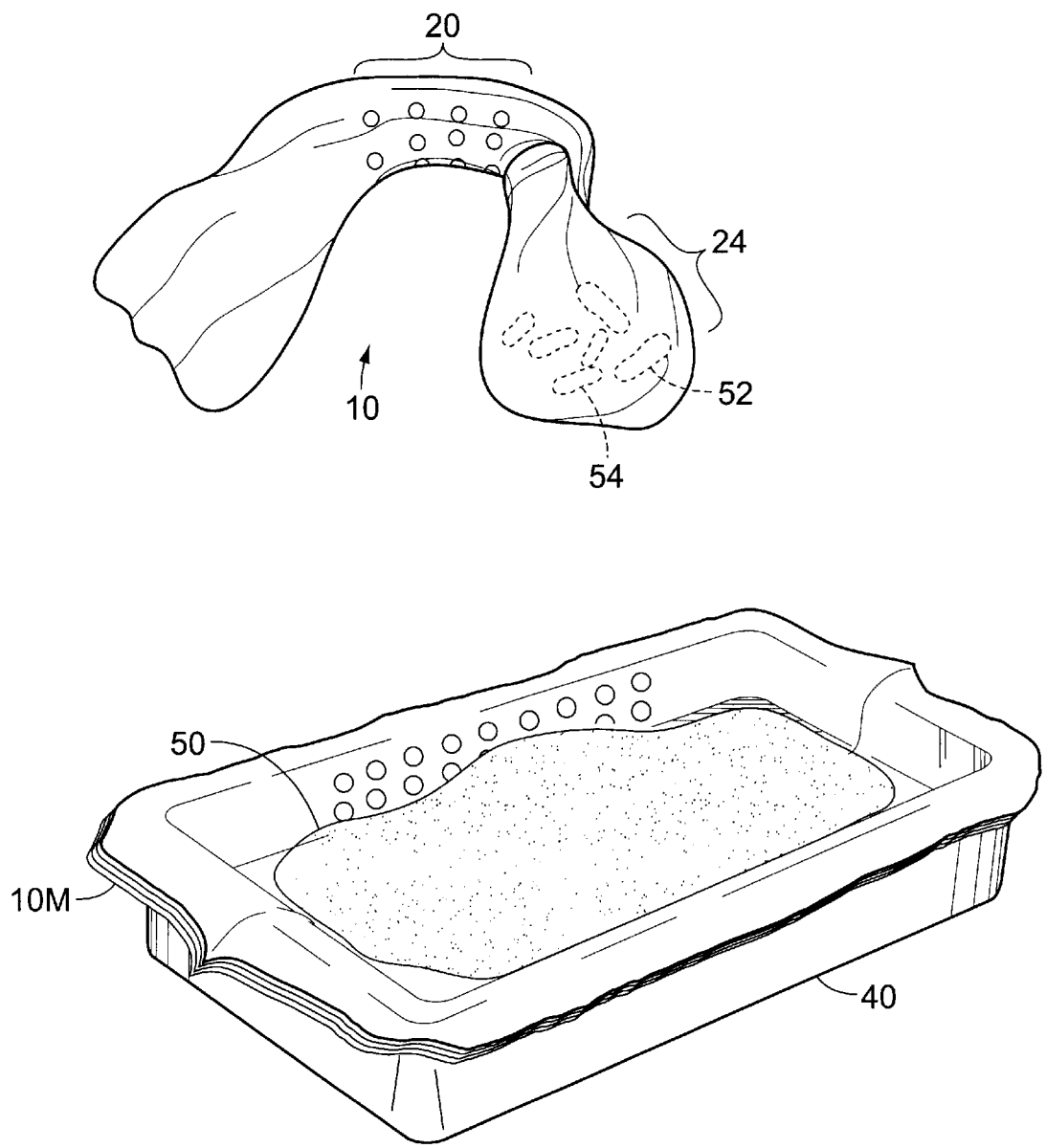
FIG. 7 is a diagrammatic perspective view, illustrating how the bag has been bound for disposal while the waste is contained within one of the non-sifting side areas. The uncontaminated litter remains in the litter box for continued use.

Also illustrated in FIG. 7, since the litter box 40 is now filled with uncontaminated cat litter 50 above the remaining bag stack 10M, the litter box 40 may be continually used, until significantly soiled. Once significantly soiled, another bag is removed from the stack, and the litter sifted, which is repeated periodically until no more bags remain on the litter box 40.

In conclusion, herein is presented a litter box sifting bag system which allows waste products and used litter to be easily and repeatedly removed from a litter box, while allowing uncontaminated litter to be separated therefrom and continually used. Accordingly, the invention is illustrated by example in the foregoing description and in the accompanying drawing figures. Numerous variations are possible while adhering to the inventive concept. Such variations are contemplated as being a part of the present invention.

What is claimed is:

1. A sifting bag method, for use with a litter box having a bottom, a top, a pair of long sides and a pair of short sides which extend upward from the bottom to the top, for use in separating waste and used litter from uncontaminated litter, using a bag having a front panel and a rear panel substantially rectangular in shape and equal in size, the front panel and rear panel having a bottom edge joined together with a bottom seam, side edges joined together with side folds, and having a top edge defining a top opening, the front panel and rear panel having a sifting region having a plurality of sifting holes, the sifting holes aligned when the front panel and rear panel are folded flat against each other, the front panel and rear panel having non-sifting regions toward the sides thereof where no sifting holes are present, comprising the steps of:

a) covering the litter box with one of the bags by opening the bags and extending the bag over the litter box, substantially covering the bottom of the litter box, and extending the top edge of the front panel and rear panel over the top of the litter box;

b) filling the litter box with uncontaminated litter;

c) allowing waste and used litter to accumulate in the litter box;

d) lifting the bag upwards from the litter box by grasping the top edges of the front and rear panels near the side folds;

e) collecting the waste and used litter within the bag by sifting the uncontaminated litter through the sifting holes;

f) transferring the waste and used litter to one of the non-sifting regions by tilting and rotating the bag so that the waste and used litter falls toward one of the side edges;

g) containing the waste and used litter between the non-sifting regions of the front and rear panels by securing the bag adjacent to said non-sifting regions; and h) disposing of the bag.

2. The sifting bag method as recited in claim 1, wherein the step of covering the bottom of the litter box further comprises the step of extending the bottom seam across the bottom of the litter box substantially equidistant from and parallel to the long sides of the litter box.

3. The sifting bag method as recited in claim 2, wherein the step of covering the litter box with the bag further comprises creating a stack of bags by repeatedly covering the litter box by extending several bags over the litter box before the step of filling the litter box with litter; and wherein the step of lifting the bag upward from the litter box further comprises lifting the uppermost bag of the stack from the litter box to leave a remaining stack of bags therebelow.

4. The sifting bag method as recited in claim 3, wherein the step of collecting the waste and used litter within the bag by sifting the uncontaminated litter through the sifting holes further comprises allowing the litter to fall onto the remaining stack of litter bags; and wherein the step of disposing of the bag is followed by the step of waiting for the uncontaminated litter to becomes soiled and then repeating steps (d) through (h) until the entire stack of bags has been removed from the litter box.

* * * * *